F. HICKMAN.
TIRE.
APPLICATION FILED FEB. 2, 1918. RENEWED JUNE 5, 1920.
1,364,758.
Patented Jan. 4, 1921.
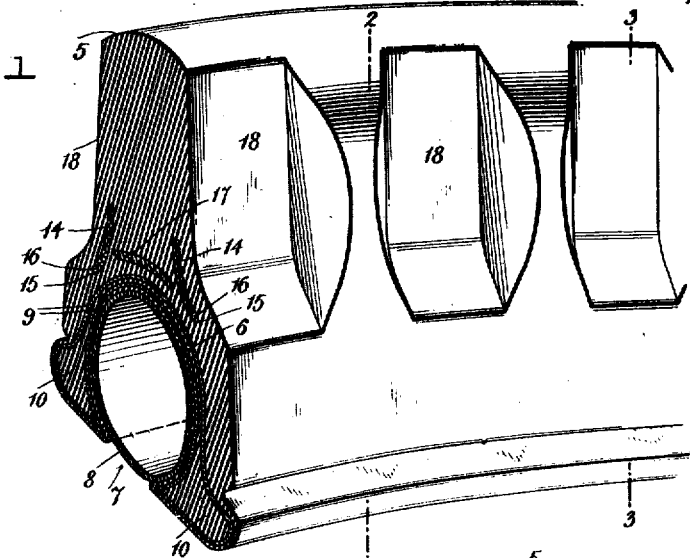
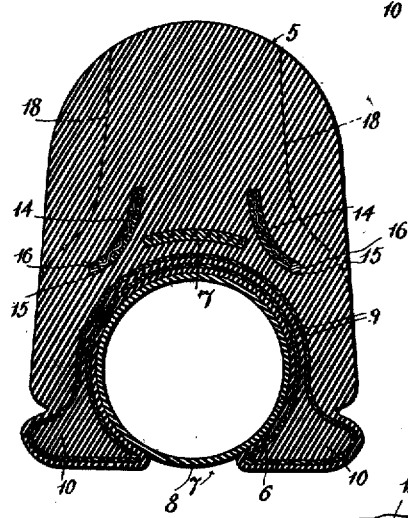
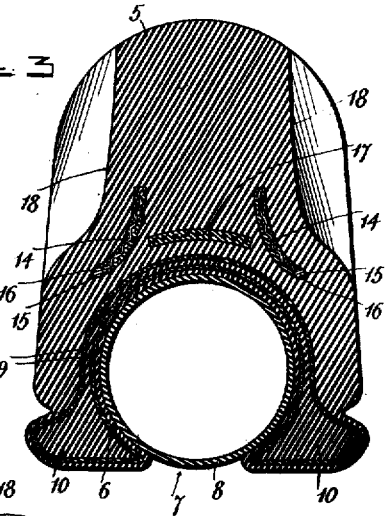
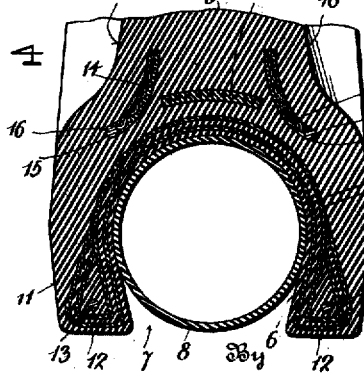
Inventor
Francis Hickman,
Witnesses

UNITED STATES PATENT OFFICE.

FRANCIS HICKMAN, OF BOUND BROOK, NEW JERSEY, ASSIGNOR OF ONE-HALF TO BOUND BROOK OIL-LESS BEARING COMPANY, OF BOUND BROOK, NEW JERSEY, A CORPORATION OF NEW JERSEY.

TIRE.

1,364,758.  Specification of Letters Patent.  Patented Jan. 4, 1921.

Application filed February 2, 1918. Serial No. 215,164. Renewed June 5, 1920. Serial No. 386,923.

*To all whom it may concern:*

Be it known that I, FRANCIS HICKMAN, a citizen of the United States, residing at Bound Brook, in the county of Somerset and State of New Jersey, have invented new and useful Improvements in Tires, of which the following is a specification.

This invention relates to cushion tires, and the primary object of the same is to provide a partially solid and partially pneumatic tire in one organization, and, as a consequence, reduce the liability of puncture and blowout to a minimum by eliminating all parts that might have movement relatively to each other, and, to a large extent, avoid frictionally generated heat within the body of the tire and between the latter and the rim to which the tire is applied. A further object of the invention is to provide a tire of novel construction having means therein in such position as to resist fracture or injury to the tire when subjected to lateral pressure or bending action during the use of the same under various conditions of travel and also to prevent puncture of the pneumatic portion of the tire which is located in such position as to be beyond reach of exterior puncturing means.

The improved tire comprises an outer solid rubber component with an inner air tube seat or opening, the greater portion of the solid tire being outwardly beyond the seat so as to give an extended cushion or resilient action, and a thickness of rubber sufficient to withstand ordinary penetrations from the exterior and thereby protect the pneumattic tire located within the seat or recess. The outer portion of the pneumatic tire is guarded and shielded by reinforcing means extending lengthwise of the tire which also adds to the resistance to penetration and protects the pneumatic tire, and approximately close to the pneumatic tire opposite sides of the vertical center are yielding reinforcing devices which are also of such structure as to resist penetration. The reinforcing devices at opposite sides of the center do not extend over the pneumatic tire seat or recess, nor along the opposite side portions of the same, but are positioned at points within the solid rubber cushion or resilient component of the tire under which is liable to fracture or break under side stress or lateral strain without in the least detracting from the general yielding or freely resilient action of the tire. The invention also consists in the details of construction and arrangement of the several parts which will be more fully hereinafter described and claimed.

In the drawing:

Figure 1 is a sectional perspective view of a portion of the tire embodying the features of the invention.

Fig. 2 is a transverse vertical section taken in the plane of the line 2—2, Fig. 1.

Fig. 3 is a view similar to Fig. 2, taken in the plane of the line 3—3, Fig. 1.

Fig. 4 is a partial transverse sectional view similar to Fig. 3, showing a slight modification.

The tire as shown by Figs. 1, 2 and 3 is composed mainly of a solid portion 5 having a recess or opening 6 accessible through the inner side, as at 7, for the reception of a pneumatic tire 8 of usual inflatable form, the seat or recess 6 having a shoe or casing 9 surrounding the same and embedded in the rubber of the portion 5 and composed preferably of fabric and rubber doubled over the seat, recess or opening 6 and extending downwardly into and close to the edges of opposite clenchers 10 which are adapted to be engaged by a rim as will be readily understood. It will be understood that the rubber portion 5 is slightly vulcanized to give it sufficient body and strength but is very resilient or has an ample yielding action to render it effective as a cushioning means. In the modified form of the tire as shown by Fig. 4 the clenchers 10, as illustrated by Figs. 1, 2 and 3, are replaced by straight sides 11 and a corresponding formation relatively to the seat, recess or opening 6 to adapt the tire for use with wheel rims having straight edges. In other particulars the modified structure shown by Fig. 4 is precisely similar to the tire as illustrated by Figs. 1, 2 and 3. In the modified form shown by Fig. 4 the shoe or casing 9 is doubled over the seat, recess or opening 6 and is extended downwardly into the rim-engaging terminals 12, wires 13 being inserted through the attaching extremities to assist in holding this form of the tire in applied position to the rim.

The most essential feature of the invention resides in segmental guards or reinforces 14 consisting of fabric and rubber strips molded in the main rubber portion 5 of the tire and curved inwardly and upwardly from lower starting points 15 where wires 16 are threaded through the tire as a strengthening means, the guards or reinforces 14 being disposed at such points as to obviate fracture or breaking of the main rubber portion 5 of the tire at the points of greatest weakness under side or lateral stress without in the least interfering with the free compression and distension of the main portion 5 of the tire when alternately subjected to and released from tractive pressure, or in passing over obstructions or inequalities in a roadway. Between the upwardly curved segmental guards or reinforces 14 is a composite strip 17 which embodies rubber and fabric elements so assembled and arranged as to be rigid or non-stretchable in a lengthwise direction but readily yielding or elastic in a cross-wise direction. The strip 17 is made yielding or elastic in a crosswise direction to permit it to readily conform to the expansion and contraction of the tire as a whole when subjected to tractive pressure, and is non-stretchable in a lengthwise direction to insure a positive retention of the same within the solid rubber or yielding cushion element and to maintain the latter in proper form circumferentially or lengthwise around the seat for the pneumatic element. This strip 17 is held fixed within the tire above the seat recess or opening 6, said strip extending fully around the interior of the wheel, as shown, and serving to protect the top portion of the pneumatic tire 8 located within the seat recess or opening 6 and also to strengthen the tire, and the guards 14 and the strip 17 coacting to set up a strong resistance at a point adjacent to the pneumatic tire and also preventing and in fact entirely obstructing the entrance of puncturing devices from the exterior through the cushion or rubber portion 5 of the tire into the seat recess or opening 6. The crosswise elasticity of the strip 17 provides for a ready conformation of said strip to the compression of the cushion 5 and, therefore, does not interfere with the free resilient action of the said cushion. The main portion or component 5 of the tire is formed at regular intervals with side recesses 18, the object of these recesses being to economize in the use of material and also to increase the sensitive resilient action of the portion or component 5. This recessed construction, however, is not absolutely necessary in the effective operation of the tire, but, for general uses, it is found preferable to have the tire constructed with the said recesses. The pneumatic tire 8 is so protected and located that it will not be liable to puncture or blowouts and the durability of the tire as a whole is materially increased, with a consequent reduction in expense of devices of this class. The improved cushion tire as a whole is sufficiently resilient to provide the necessary yielding tractive effect relatively to a road surface. It will be understood that the pneumatic tire 8 is inserted in the seat recess or opening 6 in a collapsed condition and then inflated when it will be retained in its seat and be located close to the rim of the wheel when the tire is applied to a wheel rim, with advantages in the service of the tire as a resilient or cushioning means and also in taking up and absorbing the vibrations and shocks incident to sudden jolts or jars imposed on the tire in traveling over rough roads.

What is claimed is:

1. A tire comprising a solid resilient cushion element having an inner seat, yielding non-puncturable guards extending from a point near the top of the seat upwardly into the solid cushion element on opposite sides of the center of the latter, and a composite strip transversely embedded in the cushion element at a distance outwardly from the inner seat thereof, said composite strip extending completely around the cushion element between and terminating at its opposite ends short of the said guards, and a pneumatic element disposed in said seat.

2. A tire comprising a solid cushion element having an inner seat, the cushion element having yielding non-puncturable guards extending from a point near the top of the seat upwardly into the solid cushion element on opposite sides of the center of the latter, and a pneumatic element disposed in the said seat.

3. A tire comprising a solid cushion element having an inner seat, the cushion element also having yielding non-puncturable guards extending from a point near the top of the seat upwardly into the solid cushion element in converging planes on opposite sides of the center of the latter, a protecting means extending crosswise at a distance outwardly from the said seat between the guards, the guards continuing beyond the protecting means toward the tread of the cushion element and free of the said means, and a pneumatic element disposed in the said seat.

In testimony whereof I have hereunto set my hand in presence of two subscribing witnesses.

FRANCIS HICKMAN

Witnesses:
PETER A. KOECHLEIN,
FLOYD W. CASTERLIN.